May 3, 1927.

G. R. HOFFMAN 1,627,510

BRAKING MECHANISM, MORE PARTICULARLY FOR MOTOR VEHICLES

Filed May 29, 1926

INVENTOR
Glenn R. Hoffman
BY
ATTORNEY

Patented May 3, 1927.

1,627,510

UNITED STATES PATENT OFFICE.

GLENN R. HOFFMAN, OF SPRINGFIELD, ILLINOIS.

BRAKING MECHANISM, MORE PARTICULARLY FOR MOTOR VEHICLES.

Application filed May 29, 1926. Serial No. 112,653.

My invention relates to braking mechanism for vehicles, more particularly for the Ford type of motor cars, and has for its objects to provide an improved construction for applying both the "transmission" brake and the emergency wheel-brakes at the same time so as to bring the car under better control of the driver under all conditions, and also in which the emergency brakes, alone, may be brought into action without affecting the transmission brake. It has also for its object to provide improved features by which a better equalization is obtained in the braking mechanism; also a construction which makes it possible to embody the invention in cars of the Ford type with the fewest possible changes, and to retain the elements of the emergency wheel-brakes and also of the "transmission" brake of the standard Ford construction, with the simple addition of parts as will herein appear.

To the accomplishment of the foregoing and such other objects as may hereinafter appear, the invention consists in the features hereinafter particularly described and then sought to be clearly defined by the claims, reference being had to the accompanying drawing forming a part hereof, and in which—

Figure 1:
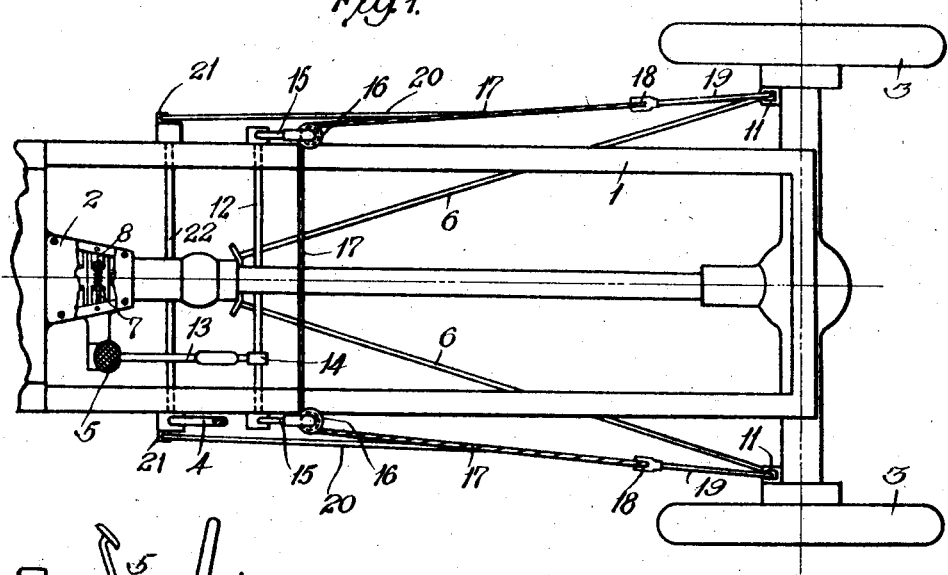
Figure 1 is a plan view of a Ford chassis showing one embodiment of my invention, and showing the position of the several parts connected for simultaneous operation of the transmission brake and emergency brakes, or the emergency brakes, alone, as desired.
Figure 2:
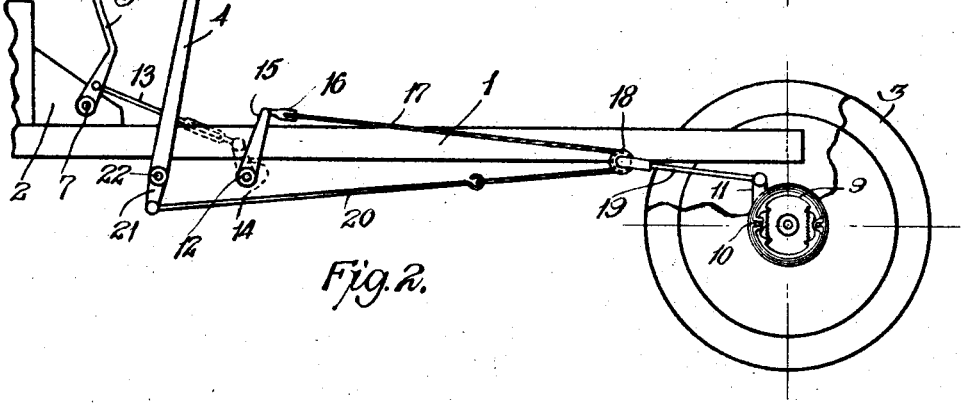
Figure 2 is a side elevation of Figure 1.

In the drawing the numeral 1 designates a chassis frame; 2 a portion of the "transmission" housing; 3, the rear wheels; 4 the emergency brake hand lever; 5 the foot-pedal or lever of the brake band for the brake-drum of the standard Ford "transmission", and 6 radius rods, all of which parts may be of the Ford standard type of construction, and therefore need not be illustrated more in detail. The foot-pedal or lever 5 will be connected through shaft 7 in the usual manner with the brake band 8 of the brake-drum of the Ford "transmission", and the emergency-wheel brakes will be of the usual Ford brake-shoe type as indicated, generally, by the numeral 9, having the usual brake-shoe operating cam 10 on the stub crank-shaft 11 to which the emergency lever connecting rod is ordinarily attached, such parts being illustrated in a conventional way merely to indicate how my improved features may be used therewith.

The numeral 12 indicates a crank-shaft suitably journaled in a part of the chassis frame and connected by a turn-buckle rod or link 13 with the transmission foot-lever 5, the link being connected to a crank 14 on shaft 12. This shaft has a crank or arm 15 at each end which carry sheaves 16, and a cable 17 passes around the sheaves and thence toward the emergency wheel brakes and around sheaves 18 attached one to each of rods or links 19 connected with the cranks of the stub shafts 11 that carry the emergency brake actuating cams, the ends of the cable being then suitably connected to the ends of the rods 20 extending from cranks 21 at the ends of the shaft 22 of the emergency brake hand lever 4.

With the transmission brake-band and the emergency wheel brakes connected together as described, by pressing on the foot-lever 5 to apply the transmission brake, the crank shaft 12 will be turned so as to pull on the cable 17 where it passes over the sheaves 16, at both sides of the chassis, and through the links 19 actuate the emergency brake cams to cause the emergency brakes to be applied at the same time that the transmission brake is applied, and thus most efficient braking of the motor vehicle obtained and brought under the easy control of the driver. By having cable 17 connected with the cranks at both ends of shaft 12 and passing from one side of the chassis to the other in substantially a straight line and then from the sheaves to the link connection with the emergency brakes an equalizing draft or pull is obtained which contributes to the prompt and easy application of the brakes. When desired, the emergency brakes can be applied by operating the emergency brake lever 4 without affecting the transmission brake, the draft or pull at such time being on the emergency wheel brakes through the connection effected by the rods 20 and the cable 17 with the links 19 as will be apparent.

The construction described makes it possible to provide a Ford motor vehicle with a braking mechanism of simple and relatively few parts, easily installed, and enabling standard parts of the Ford transmission and emergency wheel brakes to be retained, and in which when the transmission brake is applied the emergency brakes will at the same time be applied, and in which the emergency brakes may be applied without applying the transmission brake, the transmission of power in each case being directly to the same emergency brake wheel without using separate brakes, one applied externally and the other internally to the rear wheels of the vehicle.

I have illustrated and described what I consider to be the preferred details for the several parts but changes can be made therein without departing from the scope of the invention.

Having described my invention and set forth its merits, what I claim is:—

1. A braking mechanism comprising a lever operated "transmission" brake, an emergency wheel-brake, an emergency brake lever, a crank-shaft operatively connected with the "transmission" brake lever and having a cable connected with its opposite ends and extended rearwardly in the direction of the emergency wheel brakes, rods extending from the emergency lever and connected with the cable, and links connecting the cable with the emergency wheel-brakes, whereby on actuation of the "transmission" brake lever the transmission brake and both emergency wheel brakes will be applied and on actuation of the emergency lever the emergency wheel brakes, alone, will be applied.

2. A braking mechanism comprising a lever operated "transmission" brake, an emergency wheel brake, an emergency brake lever, a crank-shaft operatively connected with the "transmission" brake lever, a cable extending parallel to the crank-shaft and over sheaves at opposite ends of the shaft, and thence rearwardly in the direction of the emergency wheel brakes, connections between said cable and the emergency brake lever, and links connected with the emergency wheel brakes and having said cable sheaved to their ends, whereby on actuation of the "transmission" brake lever the transmission brake and both emergency brakes will be applied, and on actuation of the emergency lever the emergency brakes, alone, will be applied, said cable serving for equalizing the draft or pull on the emergency brakes.

In testimony whereof I affix my signature.
GLENN R. HOFFMAN.